United States Patent
Miller, III

(10) Patent No.: US 8,357,297 B2
(45) Date of Patent: *Jan. 22, 2013

(54) ANAEROBIC WASTEWATER TREATMENT SYSTEM AND PROCESS UTILIZING SOLIDS BASED BACTERIAL COLONIZATION (SBBC)

(76) Inventor: Herman P. Miller, III, Vacaville, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/773,576

(22) Filed: May 4, 2010

(65) Prior Publication Data

US 2010/0213121 A1 Aug. 26, 2010

Related U.S. Application Data

(63) Continuation-in-part of application No. 12/194,003, filed on Aug. 19, 2008, now Pat. No. 7,718,068.

(51) Int. Cl.
*C02F 3/28* (2006.01)
(52) U.S. Cl. ........ 210/603; 210/616; 210/151; 210/173; 210/188; 210/195.3
(58) Field of Classification Search .................. 210/603, 210/615, 616, 150, 151, 173, 188, 195.1, 210/195.3
See application file for complete search history.

(56) References Cited

U.S. PATENT DOCUMENTS

| | | | |
|---|---|---|---|
| 3,806,448 A | 4/1974 | Smith et al. | |
| 4,200,524 A | 4/1980 | Levin | |
| 4,500,429 A | 2/1985 | Reimann et al. | |
| 4,626,354 A * | 12/1986 | Hoffman et al. | 210/616 |
| 4,894,162 A * | 1/1990 | Cournoyer et al. | 210/603 |
| 5,015,384 A * | 5/1991 | Burke | 210/603 |
| 5,151,187 A | 9/1992 | Behmann | |
| 5,302,288 A | 4/1994 | Meidl et al. | |
| 5,310,484 A | 5/1994 | Berrigan, Jr. | |
| 5,658,458 A | 8/1997 | Keyser et al. | |
| 5,670,047 A * | 9/1997 | Burke | 210/603 |
| 6,291,232 B1 | 9/2001 | Miller, III | |
| 6,500,340 B1 * | 12/2002 | Burke | 210/603 |
| 6,632,362 B2 | 10/2003 | Miller, III | |
| 6,790,359 B2 | 9/2004 | Miller, III | |
| 6,942,798 B2 | 9/2005 | Miller, III | |
| 2010/0044305 A1 | 2/2010 | Miller, III | |

* cited by examiner

*Primary Examiner* — Christopher Upton
(74) *Attorney, Agent, or Firm* — Edward S. Wright

(57) ABSTRACT

Anaerobic Wastewater treatment system and process in which the influent is passed through a mixing chamber and then through a series of filters of progressively smaller size to separate the materials carrying the colonized bacteria from finer solids in the influent and separate the materials according to size in a completely enclosed and flooded environment. The materials from the filters are progressively reduced to a smaller size, the materials of smaller size are returned to the mixing chamber, and new influent is inoculated with the colonized bacteria carried by the materials returned to the mixing chamber.

19 Claims, 3 Drawing Sheets

ANAEROBIC WASTEWATER TREATMENT SYSTEM AND PROCESS UTILIZING SOLIDS BASED BACTERIAL COLONIZATION (SBBC)

RELATED APPLICATIONS

Continuation-in-Part of Ser. No. 12/194,003, filed Aug. 19, 2008.

BACKGROUND OF THE INVENTION

1. Field of Invention

This invention pertains generally to wastewater treatment and, more particularly, to an anaerobic wastewater treatment system and process which utilize foreign substances in the influent stream.

2. Related Art

Large quantities of fecal matter can cling to foreign materials such as rags, condoms, diapers, unprocessed garbage, whole fruits and vegetables from canneries, sand, fist-sized rocks and lumber that come floating, tumbling and sliding into the headworks of wastewater treatment plants. Such materials must be removed from the influent stream to prevent them from clogging up the system or bogging down the treatment process. The fecal matter stays with the materials when they are removed, and with the pathogens and possible viruses in the fecal matter, it presents a serious health hazard to the people who are involved in the removal, transportation and disposal of the materials.

In larger cities where sewage travels several miles to treatment facilities or where collection systems are such that flow rates are slow, bacterial growth can be deeply colonized into every crack and crevice in the materials, and rags and other porous materials are often densely packed with fecal matter that is well colonized with bacteria and quite putrid. This fecal matter presents a large quantity of potential energy.

The foreign materials are removed by a wide variety of means and commonly transported to the local garbage dump, landfill, or incinerator. A plant that processes 10 million gallons per day can, for example, accumulate several cubic yards of such material every day. In addition to the health hazard, the removal, transportation, placement or spreading of the foreign materials consumes large amounts of energy and accounts for a large percentage of total plant operating costs. Moreover, the open aerobic digestion of the fecal material produces gasses that contribute to the greenhouse effect.

OBJECTS AND SUMMARY OF THE INVENTION

It is in general an object of the invention to provide a new and improved wastewater treatment system and process.

Another object of the invention is to increase the efficiency of the wastewater treatment by providing a totally enclosed system and process that is completely anaerobic, wherein the process is isolated from the aerobic action of outside air or oxygen thus enhancing the growth and colonizing activity of the more efficient anaerobic bacteria.

These and other objects are achieved in accordance with the invention by providing a wastewater treatment system and process in which the influent is passed through a mixing chamber and then through a separator to separate the material carrying the colonized bacteria from the finer solids and/or major liquid component in the influent, the material carrying the colonized bacteria is returned to the mixing chamber, and the material carrying the colonized bacteria is mixed with new influent in the mixing chamber so the bacteria can inoculate the new influent while the clarified liquid component is either passed along to standard settling tanks or clarifiers, chlorinated, or discharged as pure water depending upon the extent of purification designed into the system's own filtration system. Air and other vapors in the influent are prevented from entering the wastewater treatment system, and system is kept flooded with wastewater at all time except for gasses that may be generated within the system. Such gasses are drawn off and piped to a digester where they are mixed with the gasses generated within the digester, thereby providing a completely anaerobic environment.

DETAILED DESCRIPTION

In the invention, a totally enclosed mixing chamber is provided at the influent input of a wastewater treatment plant. Influent entering the mixing chamber passes through a trap that removes air and other vapors from the influent and prevents them from entering the system, keeping the system flooded with wastewater at all times except for gasses that may be generated within the system itself. Those gases are drawn off and piped to a digester where they are mixed with gasses generated within the digester itself, thus providing a completely anaerobic environment through which all influent must flow at the influent input of the wastewater treatment plant. At the output of the mixing chamber, a separator or a series of separators remove the solids which are permeated with colonized bacteria from the influent waters by the use of progressively smaller series of screens or membranes. These solids are fed through a series of progressively smaller shredders, crushers, and/or grinders and are returned to the upstream side of the mixing chamber where they, in turn, colonize the bacteria in the influent stream, bringing more dissolved solids out of solution and increasing the suspended solids available to the finer separators. The process continues until the separated solids become of such fineness as to be of acceptable particle size for feedstock to the digester and the liquid effluent (water) is of sufficient quality to meet the utilization or regulatory discharges standards as determined by the final screening operation.

In the preferred embodiments, the mixing chamber, filter separators, pumps, crushers, grinders, and other components of the system are sealed units and kept saturated with liquid, i.e., anaerobic, during their operation. They can either be of the inline type or so situated as to be full of liquor at all times and so constructed as to prevent leakage of vapors, odors, fumes, or liquor.

Figure 1:
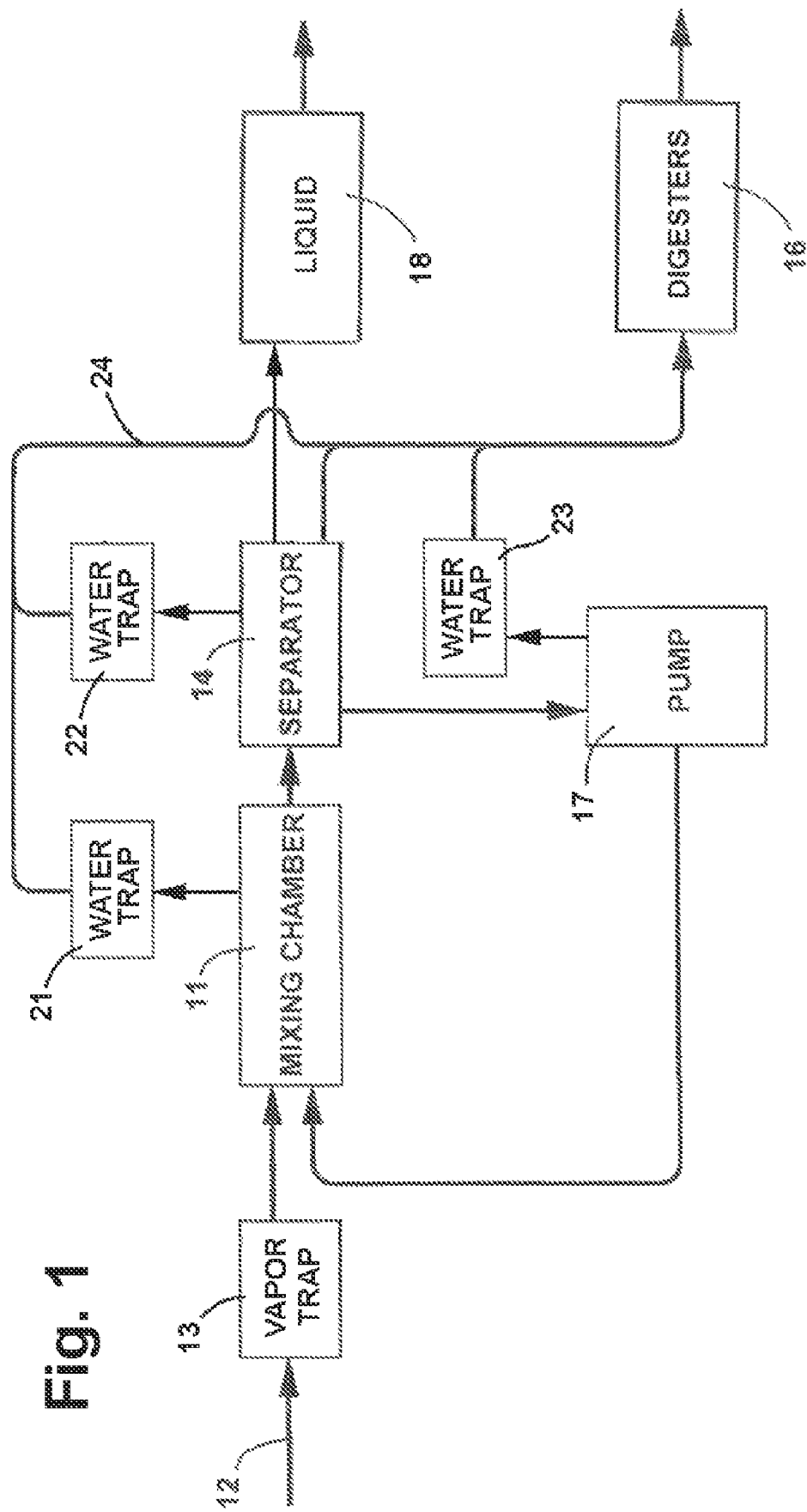
FIG. 1 is a block diagram of one embodiment of an anaerobic wastewater treatment system according to the invention.

In the embodiment illustrated in FIG. 1, the system includes a mixing chamber 11 to which the influent stream 12 of a wastewater treatment plant is fed. The influent is fed to the mixing chamber through a vapor trap 13 which removes air and other vapors from the influent and prevents them from entering the system. The air trap may be configured in many ways, for example, depending on the elevations of the various components of the treatment system, it can consist of a vertical loop in the wastewater inlet piping, with pumping to augment the flow to the loop, if desired. Level controls and/or flow controls can be used to insure proper trap action.

The trapping of air and other vapors at the inlet to the mixing chamber can also be achieved in ways that are not necessarily a physical part of the mixing chamber, for example, by taking advantage of a downhill flow of wastewater into the plant; adjusting the relative elevations of the various wastewater treatment plant components, pumping, or other means of maintaining anaerobic conditions in the wastewater treatment process.

The flow from the mixing chamber goes to a separator 14 where large foreign objects or plastic media are separated from the flow, along with the biosolid bacterial colonization, or fecal matter, attached thereto. From the separator, fine solids are delivered to the digesters 16 of the treatment plant, the larger, colonized materials go to a pump or conveyor 17 which returns them to the mixing chamber, and the major liquid component 18 is delivered to primary sedimentation. The digesters can, for example, be anaerobic digesters of the type disclosed in U.S. Pat. Nos. 6,291,232, 6,632,362, 6,790,359, and 6,942,798, the disclosures of which are incorporated herein by reference.

In the mixing chamber, the colonized materials from the separator mix with new materials from the influent stream and inoculate the new materials with the bacteria they carrying. The mixture then flows to the separator where the larger materials are once again removed and returned to the mixing chamber, and the inoculated waste stream and finer solids continue on to the digesters, while the somewhat clarified liquid continues on to its intended use or further purification.

The concentrated slurry is preferably fed into the influent as far upstream as possible in order to enhance the colonization of the plant influent as highly as possible in the time allowed.

Water traps are installed at the high points or pockets of the various components of the system to maintain flooding in the system at all times and to allow for the flow of gasses created in the system by the digestive action of the anaerobic bacteria to be added to the gasses being generated in the digester. Thus, in the embodiment of FIG. 1, water traps 21-23 are connected to mixing chamber 11, separator 14 and pump 17, with the outputs of the traps being connected to the digester by a gas line 24 and the point to which the gas is delivered in the digester depending upon the configuration of the digester.

The system is totally enclosed, and the process is completely anaerobic and isolated from the aerobic action of outside air or oxygen, thus enhancing the growth and colonizing activity of the more efficient anaerobic bacteria.

Figure 2:
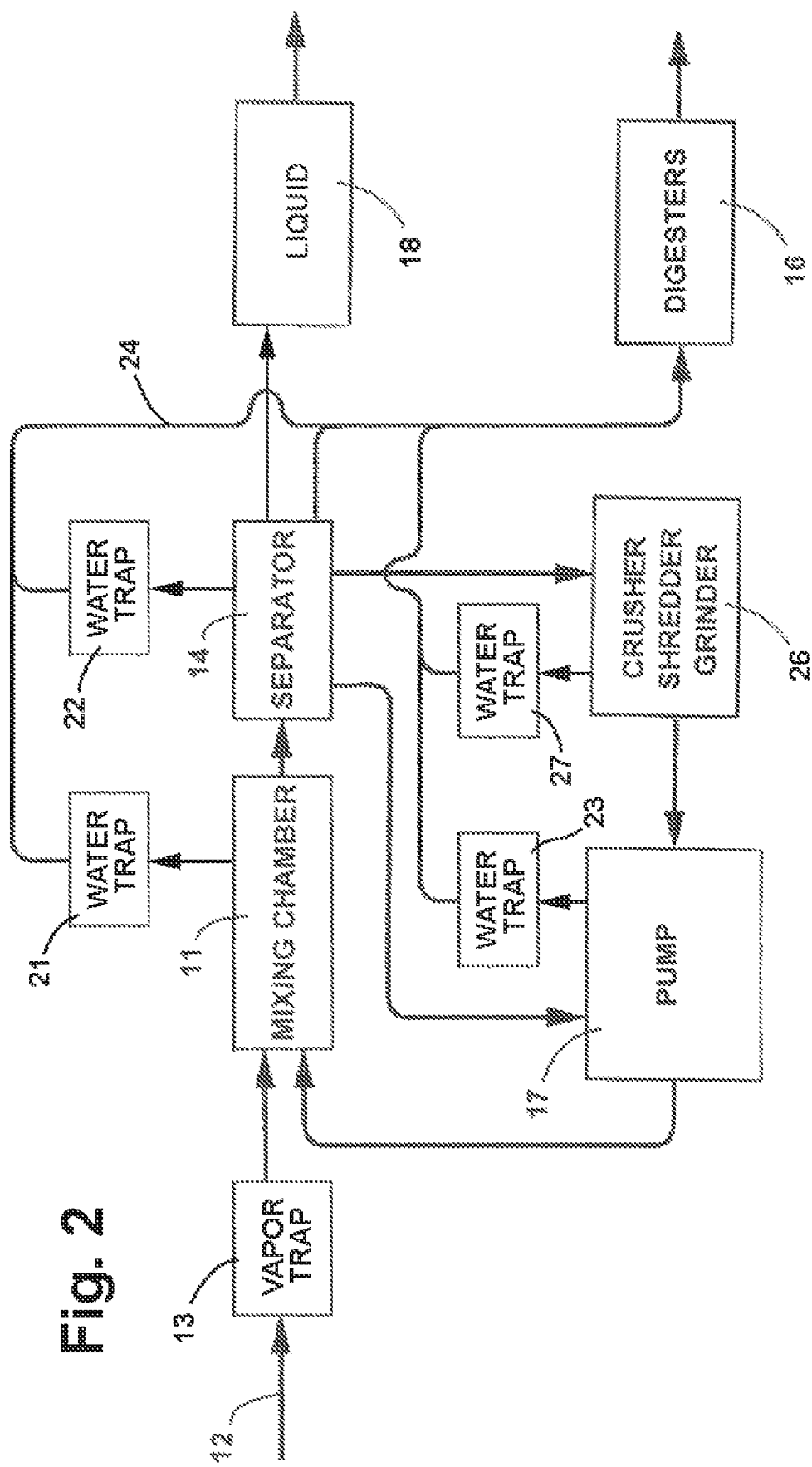
FIG. 2 is block diagram of another embodiment of an anaerobic wastewater treatment system according to the invention.

In the embodiment of FIG. 2, the system is enhanced with a two-stage separator 14 together with a crusher, shredder, or grinder 26 for reducing the size of the larger materials. The separator has a fine solid output which goes to the digester, a medium solid output which goes to pump 17, and a large solid output which goes to the crusher 26, while the clarified liquid component continues on to its intended use or further purification. The output of the crusher goes to the pump 17 and then back to the mixing chamber, and a water trap 27 removes any gasses produced by the crusher and delivers them to digester 16 for combination with the gasses generated by the digester.

Operation and use of this embodiment is similar to that of FIG. 1 except that the materials with the colonized bacteria are separated by size, with the larger materials going to the crusher where they are reduced in size and the smaller materials going directly to the pump. As in the embodiment of FIG. 1, the bacterial colonization carried by materials returned to the mixing chamber inoculates the new influent, and the inoculated influent is delivered to the digesters, while larger materials are returned to the crusher and the mixing chamber.

Figure 3:
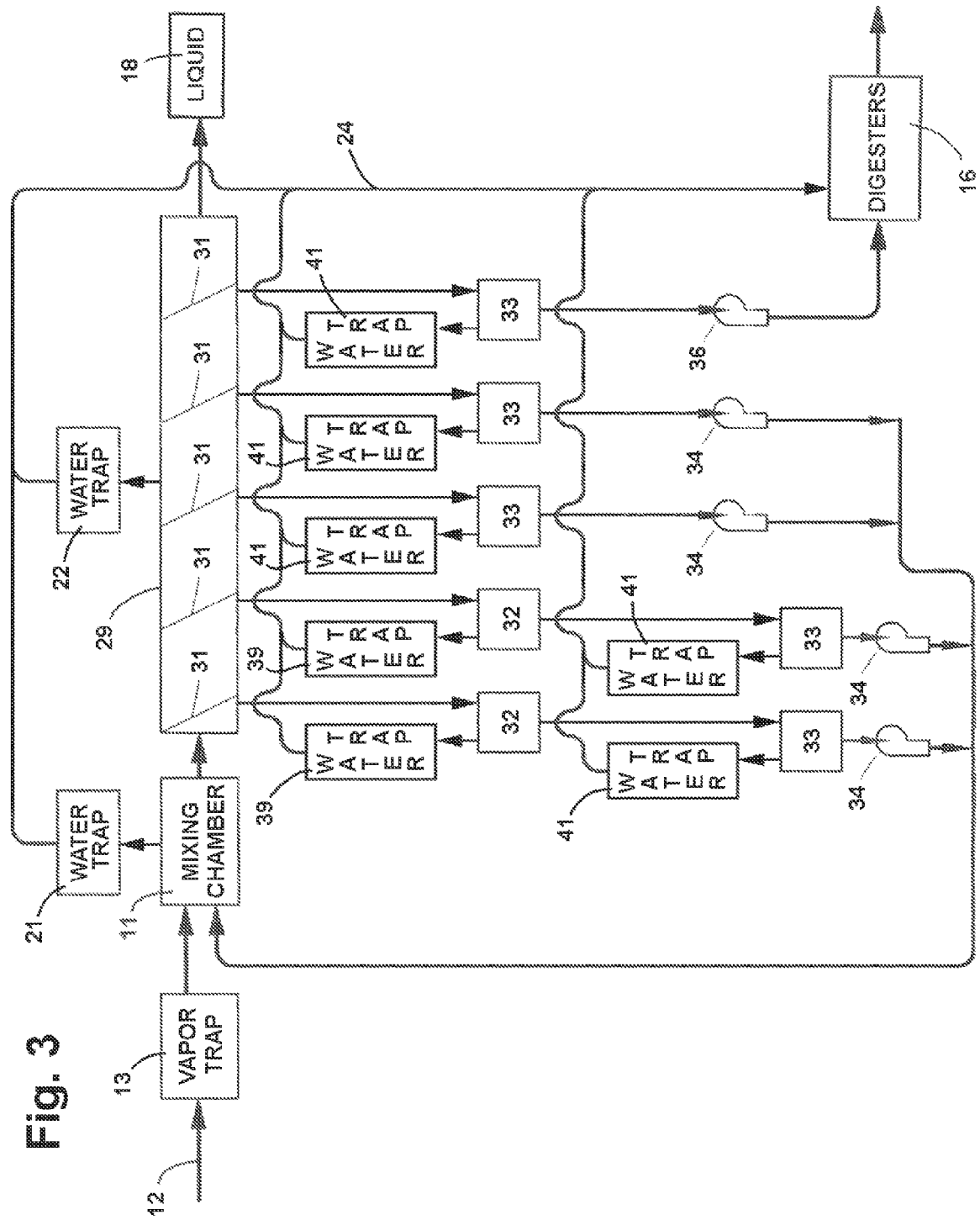
FIG. 3 is a block diagram of another embodiment of an anaerobic wastewater treatment system according to the invention.

Here again, the system is totally enclosed, and the process is completely anaerobic and isolated from the aerobic action of outside air or oxygen In the embodiment of FIG. 3, the output of mixing chamber 11 goes to a separator in the form of a filter rack 29 which has a series of screens and filters 31 of progressively smaller or finer size. The output of each of the larger screens goes to a crusher or shredder 32 and then to a grinder 33, while the outputs of the smaller screens go directly to grinders. Pumps 34 return the material from the grinders to the mixing chamber, and pump 36 delivers the output from the finest screen to digesters 16. Water traps 39, 41 are connected to crushers or shredders 32 and grinders 33 to remove any gases that may be generated in them. The gases are delivered to the digester where they are combined with the gases generated by the digester.

As in the other embodiments, it is important that the system and its components remain air tight at all times and that the fluent remain flooded at all times except for any gasses generated within the system by the action of the anaerobic bacterial colonization, thus ensuring that the process is completely anaerobic and isolated from the aerobic action of outside air or oxygen.

In this embodiment, the crushers or shredders reduce the size of the larger materials, and the grinders produce a slurry of thick solids which is delivered to mixing chamber 11 where it inoculates incoming biomass as it flows to the filter screens. The fine suspended biosolids passing through the filters are delivered to digesters 16 for further treatment, and the clear liquid or water, depending upon the filter membrane sizing, is passed along to storage 16 or its intended utilization.

If desired, a conveyor such as a belt conveyor or a screw conveyor can be used instead of a pump for returning the ground or crushed materials to the mixing chamber. Similarly, a single pump or conveyor can be used in combination with a hopper instead of the individual pumps in the embodiment of FIG. 3.

While converting the wastewater plant to anaerobic operation significantly enhances the operational efficiency of the digester, it does not eliminate the need for a digester completely due to the time differential between mean detention time of the liquid and that of the solids digesting operation, which may vary anywhere between 100:1 to 500:1. Given the much greater concentration and colonization of bacteria in this system and the inherent ability of bacteria to cling to cracks and crevices, increased gasification of the solids will take place, and with the system and its components being sealed so as to increase anaerobic colonization activity, certain amounts of gas will be generated. It is, therefore important that the water traps be provided at the high spots in the process where gasses may accumulate and that these gas buildups be fed into the gaseous zone of the digester, separated and free from the water and solids from which they are derived.

So far, the gasses that are captured from the mixing chamber, separator, and other components of the system have been described as being delivered to the digester and mixed with the gas in the digester, which is a convenient way to handle them since they are very similar to the digester gases. However, they do not necessarily have to go to the digester or be mixed with the gas in the digester. They could, for example, be flared off, separated, or utilized in applications such as firing boilers and heating the digester.

In addition to the specific embodiments disclosed herein, there are a number of other arrangements of processing equipment that can be utilized in accordance with the invention.

The invention has a number of important features and advantages. It makes use of the foreign substances found in influent streams which already abound in bacteria and are often highly colonized anaerobically and/or aerobically. By processing and concentrating such materials into a thick slurry and inoculating new influent with them, a much greater component of the volatile biosolids entering into the main plant process are heavier suspended solids in comparison to the dissolved component of same.

Moreover, with the system totally enclosed and the process completely anaerobic, the process is isolated from the aerobic action of outside air or oxygen, thus enhancing the growth and colonizing activity of the more efficient anaerobic bacteria and significantly enhancing the efficiency of wastewater treatment. This greatly increases the environmental acceptability of both the solids based bacterial colonization system and process and wastewater systems and processes in general.

The invention also overcomes a common misconception in the wastewater industry that suspended solids may be filtered out of a waste stream but that dissolved solids may not be filtered. This misconception has arisen from the classification of dissolved solids as those solids that are under two microns in size, and by providing final screening down to fractional parts of a micron, an anaerobic process plant of the invention can provide complete reclamation of its influent water to potability.

An unexpected feature of the invention is that in certain treatment systems, such as specialized commercial processes, the invention may support artificial plastic media and/or the addition of chemicals to obtain particular preconditioning requirements.

The totally enclosed system and process also improve environmental purity in eliminating greenhouse gas emissions by isolating gases, vapors, fumes, and odors from the constituents of the process from the outside air.

In addition, the overall hydraulic retention time in the process is reduced by replacing sedimentation basins and other open filter arrangements with force or gravity fed flooded filter screens and membranes, thus reducing the volumetric capacity requirements of the system.

The invention also makes it possible to increase the efficiency of the process by combining a large portion of both the filtration and digestion systems into a single process area.

The invention also eliminates inefficient and environmentally degrading aerobic bacterial activity by eliminating the need for ponds, lagoons, settling basins, open filters, and other liquid or solids processes or combinations thereof that are open to the outside air and deliver trillions of pounds of carbon to the atmosphere.

Moreover, by eliminating the need for ponds, lagoons, aeration basins, sedimentation tanks and the large areas of land occupied thereby, the invention reduces the total plant footprint in the order of 20:1 or 30:1, depending upon system variables.

By breaking down the solids based feedstock applied to the digester to smaller and smaller particles in a flooded environment, the invention increases the hydrolysis of the feedstock and significantly reduces the time required in the digester to perform hydrolization.

By enclosing the process and eliminating the open air operations that occur in settling basins, ponds, lagoons, and other open air processes where large amounts of heat energy is lost to the atmosphere, the invention conserves the heat energy carried by the fecal matter, and enhanced by the anaerobic decay, that is present in the influent of wastewater treatment plants. Moreover, by providing preheated hydrolicysed solids as influent feedstock to the digester, the invention provides substantial savings in the amount of process heat required for digester operation.

Furthermore, in cases where process heating costs may be justified, industrial wastewaters and other wastewaters with high solids content can be heated to temperatures at which mesophillic or thermophillic anaerobic bacteria thrive, thereby further reducing the mean hydraulic retention time in the digester.

It is apparent from the foregoing that a new and improved wastewater treatment system and process have been provided. While only certain presently preferred embodiments have been described in detail, as will be apparent to those familiar with the art, certain changes and modifications can be made without departing from the scope of the invention as defined by the following claims.

The invention claimed is:

1. A system for the treatment of a wastewater influent which includes material carrying colonized bacteria, comprising: a mixing chamber to which the influent is fed, a separator having a series of filters of progressively smaller sizes for receiving the influent from the mixing chamber and separating the material carrying the colonized bacteria from the finer solids in the influent, and means for returning the material carrying the colonized bacteria to the mixing chamber so that the bacteria can inoculate new influent in the mixing chamber, wherein the system is totally enclosed and isolated from the aerobic action of outside air or oxygen and the treatment is completely anaerobic.

2. The system of claim 1 including means for preventing air and other vapors in the influent from entering the mixing chamber.

3. The system of claim 1 including means for reducing the size of the material carrying the colonized bacteria before the material is returned to the mixing chamber.

4. The system of claim 3 wherein the means for reducing the size of the material carrying the colonized bacteria is selected from the group consisting of a crusher, a shredder, a grinder, and combinations thereof.

5. The system of claim 3 including means for collecting gasses produced by the means for reducing the size of the material.

6. The system of claim 1 including means for progressively reducing the size of the materials from the filters to form a thick slurry of material carrying the colonized bacteria for return to the mixing chamber.

7. A system for the treatment of a wastewater influent which includes material carrying colonized bacteria, comprising: a mixing chamber to which the influent is fed, a separator for receiving the influent from the mixing chamber and separating the material carrying the colonized bacteria from the finer solids in the influent, means for returning the material carrying the colonized bacteria to the mixing chamber so that the bacteria can inoculate new influent in the mixing chamber, a digester for receiving finer solids from the separator, and means for delivering gases produced in other components of the system to the digester.

8. The system of claim 7 wherein the means for delivering gases to the digester includes water traps connected to the mixing chamber and to the separator.

9. A process for the treatment of a wastewater influent which includes material carrying colonized bacteria, comprising the steps of: passing the influent through a mixing chamber which is totally enclosed and isolated from the aerobic action of outside air or oxygen and then through a series of filters of progressively smaller sizes in a separator which is also totally enclosed and isolated from the aerobic action of outside air or oxygen to separate the material carrying the colonized bacteria from the finer solids in the influent, returning the material carrying the colonized bacteria to the mixing chamber, and mixing the material carrying the colonized bacteria with new influent in the mixing chamber so the bacteria can inoculate the new influent.

10. The process of claim 9 including the step of removing air and other vapors from the influent before the influent enters the mixing chamber.

11. The process of claim 9 including the step of reducing the size of the material carrying the colonized bacteria before the material is returned to the mixing chamber.

12. The process of claim 11 wherein the size of the material carrying the colonized bacteria is reduced by a process selected from the group consisting of crushing, shredding, grinding, and combinations thereof.

13. The process of claim 9 including the step of progressively reducing the size of the materials from the filters to form a thick slurry of material carrying the colonized bacteria which is returned to the mixing chamber.

14. A process for the treatment of a wastewater influent which includes material carrying colonized bacteria, comprising the steps of: passing the influent through a mixing chamber which is totally enclosed and isolated from the aerobic action of outside air or oxygen and then through a separator which is also totally enclosed and isolated from the aerobic action of outside air or oxygen to separate the material carrying the colonized bacteria from the finer solids in the influent, returning the material carrying the colonized bacteria to the mixing chamber, mixing the material carrying the colonized bacteria with new influent in the mixing chamber so the bacteria can inoculate the new influent, delivering finer solids from the separator to a digester, and delivering gases produced in other components of the system to the digester.

15. The system of claim 14 wherein the gases delivered to the digester are captured from the mixing chamber and the separator.

16. A system for the treatment of a wastewater influent which includes materials carrying colonized bacteria, comprising: a mixing chamber to which the influent is fed, means for preventing air and other vapors in the influent from entering the mixing chamber, a series of filters of progressively smaller size to which the influent is fed from the mixing chamber for separating the materials carrying the colonized bacteria from finer solids in the influent and separating the materials according to size, means for progressively reducing materials from the filters to a smaller size, means for returning the materials of smaller size to the mixing chamber so that the colonized bacteria carried by the materials can inoculate new influent in the mixing chamber, a digester, and means for capturing gasses generated in the mixing chamber, the separator, and the filters and delivering the separated gases to the digester.

17. The system of claim 16 including means for keeping the system flooded with wastewater.

18. A process for the treatment of a wastewater influent which includes material carrying colonized bacteria, comprising the steps of: passing the influent through a mixing chamber which is totally enclosed and isolated from the aerobic action of outside air or oxygen, feeding the influent from the mixing chamber through a series of filters of progressively smaller size which are totally enclosed and isolated from the aerobic action of outside air or oxygen to separate the materials carrying the colonized bacteria from finer solids in the influent and separate the materials according to size, progressively reducing materials from the filters to a smaller size, returning the materials of smaller size to the mixing chamber, inoculating new influent with the colonized bacteria carried by the materials returned to the mixing chamber, capturing gasses generated in the mixing chamber, the separator, and the filters and delivering the separated gases to a digester.

19. The process of claim 18 wherein the mixing chamber, the separator, and the filters are kept flooded with wastewater.

* * * * *